US012100303B2

(12) United States Patent
Vemuri et al.

(10) Patent No.: US 12,100,303 B2
(45) Date of Patent: Sep. 24, 2024

(54) SYSTEM AND METHOD FOR MULTI-MODE CONNECTIVITY FOR GROUP VEHICLE ACTIVITY AND FOR OVER-THE-AIR UPDATES VIA TIME SYNCHRONIZED DEVICE-TO-DEVICE SIDE-LINK COMMUNICATIONS

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Scott T. Droste, West Bloomfield, MI (US); Andrew J. MacDonald, Grosse Pointe Park, MI (US); Sitaram Emani, Novi, MI (US); Ashhad Mohammed, W. Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 17/882,924

(22) Filed: Aug. 8, 2022

(65) Prior Publication Data
US 2024/0046799 A1     Feb. 8, 2024

(51) Int. Cl.
*G08G 1/00* (2006.01)
*G06F 8/65* (2018.01)
(Continued)

(52) U.S. Cl.
CPC ............ *G08G 1/22* (2013.01); *G06F 8/65* (2013.01); *G07C 5/008* (2013.01); *H04L 67/34* (2013.01); *H04W 4/44* (2018.02); *G08G 1/207* (2013.01)

(58) Field of Classification Search
CPC ............ G08G 1/20; G08G 1/207; G08G 1/22; G08G 1/0965; G08G 1/01; G08G 1/0104;
(Continued)

(56) References Cited

U.S. PATENT DOCUMENTS

| | | | |
|---|---|---|---|
| 2018/0349157 A1* | 12/2018 | Ahmed | H04W 52/0216 |
| 2019/0274017 A1* | 9/2019 | Wang | H04L 12/1854 |
| 2020/0247424 A1* | 8/2020 | Dudar | G05B 19/042 |

OTHER PUBLICATIONS

Kerliu et al., Secure Over-the Air Firmware Updates for Sensor Networks, 2019, IEEE (Year: 2019).*

* cited by examiner

*Primary Examiner* — Russell Frejd
*Assistant Examiner* — Sara J Lewandroski
(74) *Attorney, Agent, or Firm* — Quinn IP Law

(57) ABSTRACT

A system for multi-mode connectivity for group vehicle activity and for over-the-air updates via time synchronized device-to-device side-link communications is provided. The system includes a remote communication device configured to transmit data, vehicles to receive the data, and a computerized controller. The controller includes programming to analyze hardware of the vehicles to identify alpha vehicles including excellent wireless capabilities, monitor signal strength between the vehicles and the remote communication device to identify vehicles including relatively strong communication strength, and determine a portion of the plurality of vehicles including highly functioning vehicles including the capabilities and communication strength. The controller generates a series of data transfers to first transfer the data from the remote communication device a highly functioning vehicle and subsequently transfer the data from the highly functioning vehicle to a second of the vehicles and transfers the data. The highly functioning vehicle retransmits the data to the second vehicle.

19 Claims, 5 Drawing Sheets

(51) Int. Cl.
*G07C 5/00* (2006.01)
*H04L 67/00* (2022.01)
*H04W 4/44* (2018.01)

(58) Field of Classification Search
CPC .. G08G 1/0108; G08G 1/0112; G08G 1/0141;
G07C 5/008; G06F 8/60; G06F 8/65;
G06F 8/70; G06F 8/71; H04L 67/34;
H04L 67/12; H04W 4/42; H04W 4/44;
H04W 4/46; H04W 4/50; H04W 4/60;
H04W 4/70; H04W 4/80; H04W 8/18;
H04W 8/183; H04W 8/186; H04W 8/20;
H04W 8/205; H04W 8/22; H04W 8/24;
H04W 8/245; H04W 48/02; H04W 48/04;
H04W 48/06; H04W 48/08; H04W 48/10;
H04W 48/12; H04W 48/14; H04W 48/16;
H04W 48/17; H04W 48/18; H04W 48/20
See application file for complete search history.

SYSTEM AND METHOD FOR MULTI-MODE CONNECTIVITY FOR GROUP VEHICLE ACTIVITY AND FOR OVER-THE-AIR UPDATES VIA TIME SYNCHRONIZED DEVICE-TO-DEVICE SIDE-LINK COMMUNICATIONS

INTRODUCTION

The disclosure generally relates to a system and method for multi-mode connectivity for group vehicle activity and for over-the-air updates via time synchronized device-to-device side-link communications.

Data may be transmitted from a source to a plurality of vehicles. Over-the-air (OTA) updates include wireless delivery of updates to a computerized device. The updates may include firmware, software, and other updated data. A user of a vehicle may request downloads of new software applications. An operator of a remote server device may provide data for download to vehicles in a selected group or members of an online service.

SUMMARY

A system for multi-mode connectivity for group vehicle activity and for over-the-air updates via time synchronized device-to-device side-link communications is provided. The system includes a remote communication device including a wireless transmitter configured for providing data through a wireless connection, a plurality of vehicles to receive the data through the wireless connection, and a computerized data transfer controller. The controller includes programming to analyze hardware of each of the plurality of vehicles to determine a first portion of the plurality of vehicles as alpha vehicles including hardware enabling excellent wireless capabilities, monitor signal strength between each of the plurality of vehicles and the remote communication device to determine a second portion of the plurality of vehicles as vehicles including relatively strong communication strength, and determine a third portion of the plurality of vehicles including a plurality of highly functioning vehicles that belong to the first portion and to the second portion. The controller further includes programming to generate a series of data transfers useful to first transfer the data from the remote communication device to one of the highly functioning vehicles and subsequently transfer the data from the one of the plurality of highly functioning vehicles to a second of the plurality of vehicles and transfer the data from the remote communication device to the one of the plurality of highly functioning vehicles. The one of the plurality of highly functioning vehicles subsequently retransmits the data to the second of the plurality of vehicles.

In some embodiments, the remote communication device includes one of an access point, a cellular tower, or a wi-fi network.

In some embodiments, the programming to generate the series of data transfers includes programming to generate a plurality of simultaneous data transfers.

In some embodiments, the series of data transfers include an over-the-air update to one of software or firmware.

In some embodiments, the programming to monitor the signal strength between each of the plurality of vehicles and the remote communication device is dynamically iteratively performed. The programming to generate the series of data transfers is adjusted based upon the iteratively performed monitoring of the signal strength.

In some embodiments, the remote communication device is a first remote communication device. The system further includes a second remote communication device.

In some embodiments, the first remote communication device and the second remote communication device each utilize a different communication technology.

In some embodiments, one of the plurality of vehicles includes a plurality of electronic control units to be updated. The programming to generate the series of data transfers includes a first data transfer from a first one of the remote communication device or one of the high functioning vehicles to a first of the plurality of electronic control units. The programming to generate the series of data transfers further includes a second data transfer from a different one of the remote communication device or one of the high functioning vehicles to a second of the plurality of electronic control units.

In some embodiments, the first data transfer and the second data transfer are simultaneous.

In some embodiments, the remote communication device transfers the data to the plurality of the highly functioning vehicles. The plurality of the highly functioning vehicles subsequently transfers the data to a remainder of the plurality of vehicles.

According to one alternative embodiment, a system for multi-mode connectivity for group vehicle activity and for over-the-air updates via time synchronized device-to-device side-link communications is provided. The system includes a first remote communication device including a first wireless transmitter configured for providing data through a first wireless connection and a second remote communication device including a second wireless transmitter configured for providing the data through a second wireless connection. The system further includes a plurality of vehicles to receive the data through one of the first wireless connection or the second wireless connection and a computerized data transfer controller. The controller includes programming to analyze hardware of each of the plurality of vehicles to determine a first portion of the plurality of vehicles as alpha vehicles including hardware enabling excellent wireless capabilities and monitor signal strength between each of the plurality of vehicles and the first remote communication device and the second remote communication device to determine a second portion of the plurality of vehicles as vehicles including relatively strong communication strength. The controller further includes programming to determine a third portion of the plurality of vehicles including a plurality of highly functioning vehicles that belong to the first portion and to the second portion and generate a series of data transfers useful to first transfer the data from one of the first remote communication device or the second remote communication device to one of the plurality of highly functioning vehicles and subsequently transfer the data from the one of the plurality of highly functioning vehicles to a second of the plurality of vehicles. The computerized data transfer controller selects between the first remote communication device and the second remote communication device based upon one of cost or time. The controller further includes programming to transfer the data from the one of the first remote communication device or the second remote communication device to the one of the plurality of highly functioning vehicles. The one of the plurality of highly functioning vehicles subsequently retransmits the data to the second of the plurality of vehicles.

In some embodiments, the programming to generate the series of data transfers includes programming to generate a plurality of simultaneous data transfers.

In some embodiments, the series of data transfers include an over-the-air update to one of software or firmware.

In some embodiments, the programming to monitor the signal strength is dynamically iteratively performed. The programming to generate the series of data transfers is adjusted based upon the iteratively performed monitoring of the signal strength.

In some embodiments, the first remote communication device and the second remote communication device each utilize a different communication technology.

According to one alternative embodiment, a method for multi-mode connectivity for group vehicle activity and for over-the-air updates via time synchronized device-to-device side-link communications is provided. The method includes operating a remote communication device including a wireless transmitter configured for providing data through a wireless connection to a plurality of vehicles through the wireless connection. The method further includes, within a computerized processor, analyzing hardware of each of the plurality of vehicles to determine a first portion of the plurality of vehicles as alpha vehicles including hardware enabling excellent wireless capabilities and monitoring signal strength between each of the plurality of vehicles and the remote communication device to determine a second portion of the plurality of vehicles as vehicles including relatively strong communication strength. The method further includes, within the computerized processor, determining a third portion of the plurality of vehicles including a plurality of highly functioning vehicles that belong to the first portion and to the second portion and generating a series of data transfers useful to first transfer the data from the remote communication device to one of the plurality of highly functioning vehicles and subsequently transfer the data from the one of the plurality of highly functioning vehicles to a second of the plurality of vehicles. The method further includes, within the computerized processor, transferring the data from the remote communication device to the one of the plurality of highly functioning vehicles. The method further includes subsequently retransmitting the data from the one of the plurality of highly functioning vehicles to the second of the plurality of vehicles.

In some embodiments, generating the series of data transfers includes generating a plurality of simultaneous data transfers.

In some embodiments, monitoring the signal strength between each of the plurality of vehicles and the remote communication device is dynamically iteratively performed. Generating the series of data transfers is adjusted based upon the iteratively performed monitoring of the signal strength.

In some embodiments, the method further includes transferring the data from the remote communication device to the plurality of the highly functioning vehicles and subsequently transferring the data from the plurality of the highly functioning vehicles to a remainder of the plurality of vehicles.

The above features and advantages and other features and advantages of the present disclosure are readily apparent from the following detailed description of the best modes for carrying out the disclosure when taken in connection with the accompanying drawings.

DETAILED DESCRIPTION

Figure 1:
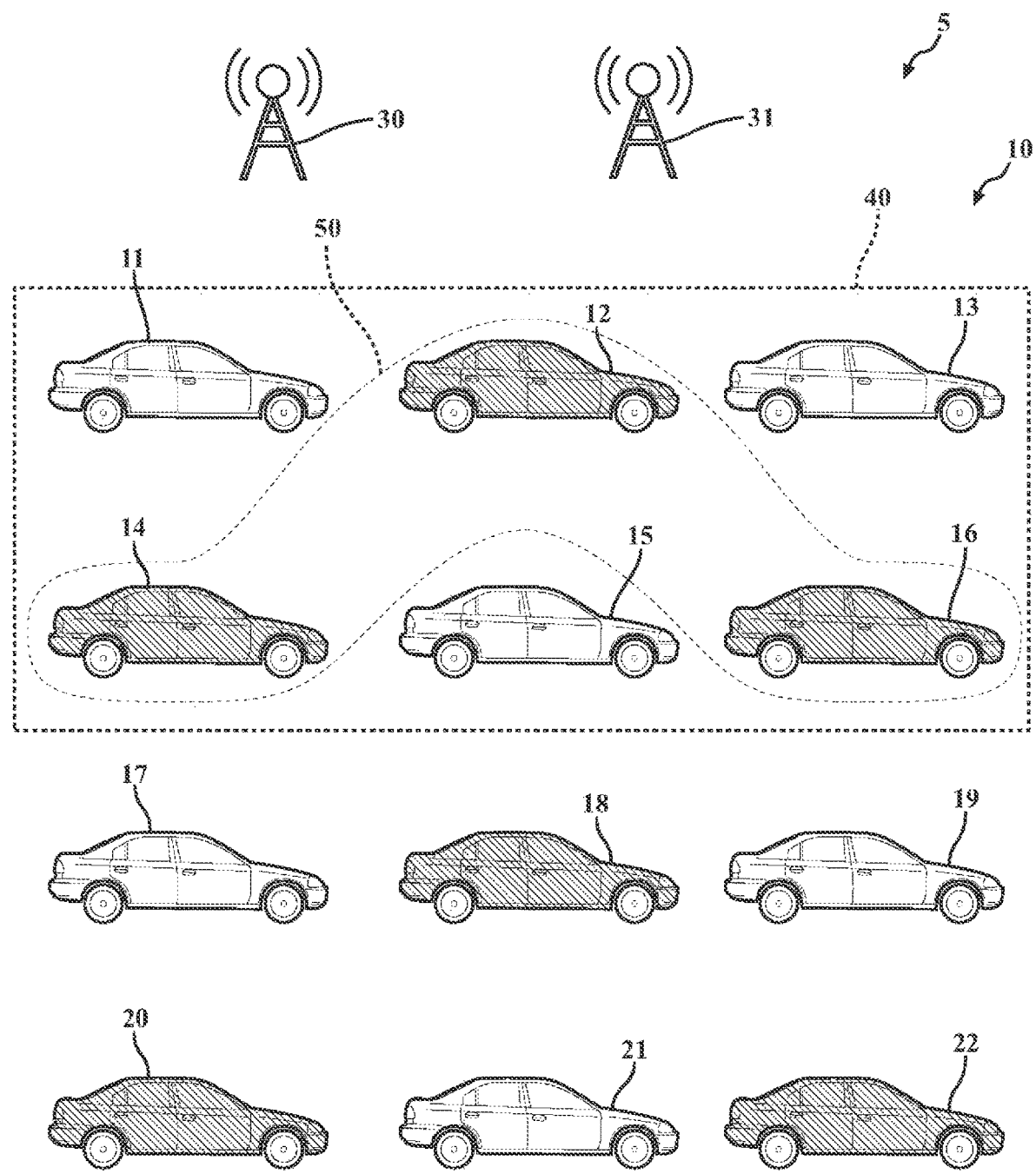
FIG. 1 schematically illustrates a system for multi-mode connectivity for group vehicle activity and for over-the-air updates via time synchronized device-to-device side-link communications, in accordance with the present disclosure.

Connectivity and wireless data bandwidth are important features in mobile electronic devices. The use of software and computerized methods in mobile electronic devices expands every year. Providing data in the form of data files, updates, streaming content, and other similar forms of data seamlessly is important to maintaining an excellent user experience.

Vehicles include installed mobile electronic devices. For example, a telematics module or a computerized telematics controller may frequently or continuously send and receive data from wirelessly networked remote server devices and/or cloud resources. In one exemplary data transfer, a plurality of vehicles at a manufacturing facility may be queued to receive a software update to one or more computerized systems in the vehicle (a powertrain controller, a vehicle navigation system, an audio infotainment system, etc.) The manufacturing facility may include a wireless transmitter or a wireless communications network configured to transfer information from a remote server device of the facility to the plurality of vehicles. However, the transmitter may not include ideal wireless connections with each of the vehicles being updated. For example, access point (AP) or remote communication device proximity, geography, weather, electro-magnetic interference, network congestion, and materials used to construct the manufacturing facility may cause interference between the wireless transmitter and a portion of the plurality of vehicles. As a result, data transfers and software updates to the portion of the plurality of vehicles may fail or may take an unreasonably long period to accomplish.

A system and method for multi-mode connectivity for group vehicle activity and for over-the-air updates via time synchronized device-to-device side-link communications are provided. The disclosed system and method may include efficient hybrid utilization of side-link vehicle-to-vehicle (V2V) communications within a plurality of vehicles and/or use of high performing vehicles as wireless hubs for data transfers and over-the-air (OTA) updates to software or firmware. These data transfers and OTA updates may occur in manufacturing facilities, at vehicle dealerships, in commercial/retail parking lots, or as vehicles move through traffic upon a roadway.

In one embodiment, the system and method may analyze the plurality of vehicles to identify within the plurality of vehicles a portion of the plurality of vehicles with hardware enabling excellent wireless capabilities. Such an analysis may include determining which vehicles have most up to date hardware and/or software configured to facilitate rapid data transfer. Such an analysis may include determining which vehicles have upgraded or excellent processor speed or increased quantities of random-access-memory (RAM) useful top facilitate rapid data transfer. Such an analysis may include determining which vehicles include sufficient memory capacity to accomplish both receiving the data transfer for that vehicle and additionally including additional data that may be required to update other vehicles with different hardware or software configurations. Such an analysis may include determining which vehicles include wireless communication devices capable of establishing high-speed data transfer connections. Vehicles selected from the plurality of vehicles may be described as a more capable portion of the plurality of vehicles or as alpha vehicles of the plurality of vehicles.

In one embodiment, the system and method may determine which vehicles of the plurality of vehicles may establish or maintain relatively strong communication connections with the remote communication device configured for initiating a data transfer or OTA update. Vehicles including relatively strong communication strength may, in particular, such vehicles also including properties of alpha vehicles described herein, may be described as highly functioning vehicles. The strength of the communication may be described as a signal strength. A signal strength may be monitored or determined between a transmitter and a receiver. In one example, the disclosed system and method may compare a determined signal strength to a threshold signal strength, and the communication connection between the remote communication device and the vehicle may be described or labeled as a relatively strong communication connection if the determined signal strength is greater than the threshold. In another example, signal strengths for the plurality of vehicles may be determined, the signal strengths may be compared and ranked relative to each other, and a portion of the vehicles including higher signal strength rankings may be identified as including a relatively strong communication connection with the remote communication device.

Within the plurality of vehicles, a first portion of the vehicles may be selected as alpha vehicles including hardware enabling excellent wireless capabilities. With the plurality of vehicles, a second portion of vehicles may be selected as vehicles including a relatively strong communication connection with an AP configured for initiating a data transfer or OTA update. A portion of the plurality of vehicles that belong to the first portion of vehicles and the second portion of vehicles may be identified as a third portion of the plurality of vehicles or as high performing vehicles of the plurality of vehicles.

Alpha vehicles and vehicles with a relatively strong communication connection may be dynamically selected. A high performing vehicle determination may be executed within a first few time slots from a cellular/Wi-fi time division duplex (TDD) systems.

The disclosed system and method may include a receive and retransmit process, whereby a high performing vehicle receives data or an OTA update from a remote communication device such as an AP, another vehicle, a cellular tower, or a short range wi-fi network, and the high performing vehicle retransmits the data via side-link or V2V communications to another vehicle that does not yet have the data or OTA update. The system and method may include time synchronization of the receive and retransmit process of high performing vehicles using a listen before talk protocol among other protocols.

In one embodiment, the disclosed system and method may include segmenting radio access technologies (RATS) (e.g., fourth generation (4G), 5G, etc.) for multi-electronic control unit (ECU) simultaneous updates. The method may include using different communication protocols and technologies to update multiple ECUs in a vehicle to be updated. In one example, where a vehicle to be updated is in an area with poor communications, a plurality of alpha vehicles may be used to communicate with the vehicle to be updated, with an exemplary first alpha vehicle attempting to update a first ECU in the vehicle to be updated, with an exemplary second alpha vehicle attempting to update a second ECU in the vehicle to be updated, and with an exemplary third alpha vehicle attempting to update a third ECU in the vehicle to be updated. If the updates to the first and second ECUs are successful but the update to the third ECU fails, a subsequent attempt may be made with one of the first and second alpha vehicles.

The disclosed system and method may be utilized for smart scheduling and/or assignment of vehicle-to-everything (V2X) communication resources for a group of vehicles.

The disclosed system and method may enable or facilitate high speed/high-capacity enhanced mobile broadband (eMBB) for use with fifth generation (5G) devices. Mulit-ECUs OTA update packages may be simultaneously operated for a plurality of vehicles in a manufacturing plant or a dealership setting.

The disclosed system and method may be utilized in low demand or low-capacity operations. In one embodiment, ultra-reliable low latency communications (URLLC) such as operation of a platooning lane having the same activity/goal may be enabled. Multi-lane platooning vehicles may be operated with common messages but different device-to-device (D2D) parameters.

In one embodiment, where insufficient communication capacity is detected to update a vehicle to be updated, the disclosed method may include seeking, mapping, or moving resources to create additional data pipes to support the required data transfer.

In another embodiment, where more than adequate resources are present to update the vehicles to be updated, the disclosed system and method may assign updating and data transfer tasks to communication resources and alpha vehicles as a function of cost and/or time.

Referring now to the drawings, wherein like reference numbers refer to like features throughout the several views, FIG. 1 schematically illustrates a system 5 for multi-mode connectivity for group vehicle activity and for over-the-air updates via time synchronized device-to-device side-link communications. The system 5 is illustrated including a remote communication device 30 and a plurality of vehicles 10, including vehicle 11, vehicle 12, vehicle 13, vehicle 14, vehicle 15, vehicle 16, vehicle 17, vehicle 18, vehicle 19, vehicle 20, vehicle 21, and vehicle 22. The remote communication device is a transmitter/receiver unit embodied as a wireless communication device useful to enable data transfer and/or OTA updates to at least one of the plurality of vehicles 10.

A first portion of the plurality of vehicles 10 includes vehicles 12, 14, 16, 18, and 22 (illustrated for clarity sake with shading) including alpha vehicles with hardware identified enabling excellent wireless capabilities. For simplicity sake, half of the plurality of vehicles 10 are illustrated as alpha vehicles, and the alpha vehicles are illustrated evenly dispersed throughout the plurality of vehicles 10. In actual use, more or less than half of the plurality of vehicles 10 may be identified as alpha vehicles, and the distribution of the alpha vehicles within the plurality of vehicles 10 may be uneven.

A second portion 40 of the plurality of vehicles are illustrated each including a relatively strong communication connection with the remote communication device 30. The second portion 40 is illustrated for simplicity sake to include a half of the plurality of vehicles 10 closest to the remote communication device 30. In actual use, the second portion 40 may include more or fewer than half of the plurality of vehicles 10, and a number of factors other than distance from the remote communication device 30 may indicate or be decisive related to membership in the second portion 40. A second remote communication device 31 may additionally be utilized. In one embodiment, the remote communication device 30 and the second remote communication device 31 may utilize different communication technologies (e.g., cellular and short range wi-fi) to take advantage of the strengths of each. Cost and/or time restraints may be utilized to determine which of the plurality of vehicles 10 are to be serviced by the remote communication device 30 and which are to be serviced by the second remote communication device 31.

A third portion 50 of the plurality of vehicles 10 is illustrated including alpha vehicles belonging to the first portion of the plurality of vehicles 10 that additionally belong to second portion 40 of the plurality of vehicles 10. The third portion 50 of the plurality of vehicles 10 may be described as vehicles including hardware identified enabling excellent wireless capabilities and as vehicles including a relatively strong communication connection with the remote communication device 30. The third portion may alternatively be described as highly functioning vehicles. Vehicles 12, 14, and 16 illustrated belonging to the third portion 50. The third portion 50 may include a single vehicle. The third portion 50 alternatively may include a majority of the plurality of vehicles 10.

Figure 2:
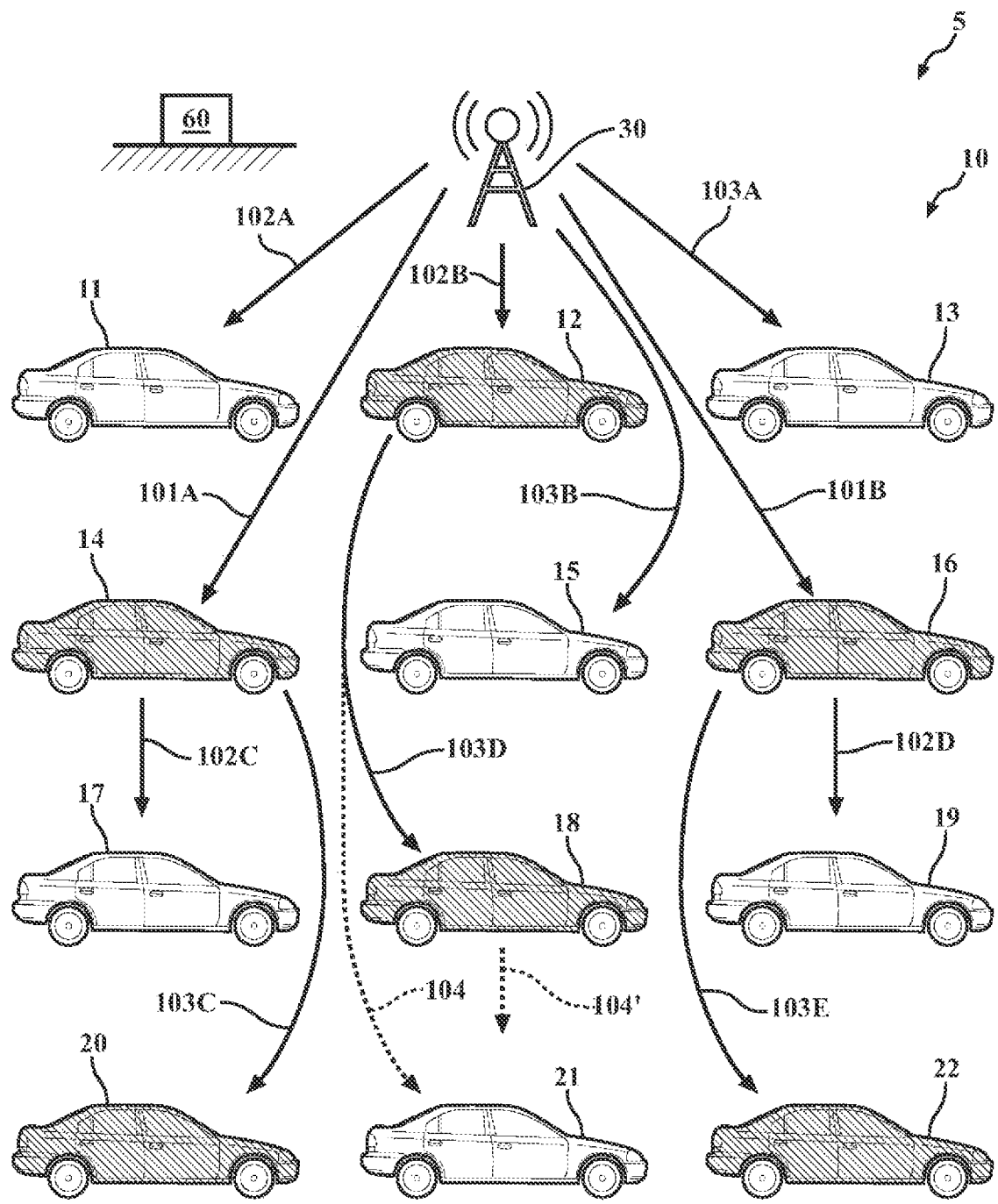
FIG. 2 schematically illustrates the system of FIG. 1 including an exemplary flow of data from the access point, to the third portion of vehicles of FIG. 1, and to a remainder of the plurality of vehicles of FIG. 1, in accordance with the present disclosure.

The system 5 includes computerized programming to initially transmit data (which may include an OTA update) from the remote communication device 30 to the third portion 50 of the plurality of vehicles 10. The system 5 further includes computerized programming to subsequently transmit the data or a portion thereof from one or more vehicles belonging to the third portion 50 of the plurality of vehicles to one of the vehicles that does not belong to the third portion 50. FIG. 2 schematically illustrates the system 5 of FIG. 1 including an exemplary flow of data from the remote communication device 30, to the third portion of vehicles 50 of FIG. 1, and to a remainder of the plurality of vehicles 10 of FIG. 1. A remote server device 60 is illustrated configured for providing computational resources and data storage supporting data transfers from the remote communication device 30 to the plurality of vehicles 10. FIG. 2 illustrates a series of time synchronized data transfers. A first plurality of data transfers 101A and 101B is illustrated, representing a simultaneous data transfer from the remote communication device 30 to two vehicles of the third portion 50 including the vehicles 14 and 16. A second plurality of data transfers 102A, 102B, 102C, and 102D is illustrated representing simultaneous data transfers within the system 5. Data transfer 102B illustrates data transfer from the remote communication device 30 to the vehicle 12 of the third portion 50.

In one embodiment, the remote communication device 30 may transmit data to the vehicles of the third portion 50 and may not transmit data to the vehicles that do not belong to the third portion 50. In the embodiment of FIG. 2, data transfer 102A illustrates data transfer from the remote communication device 30 to the vehicle 11, utilizing available bandwidth of the access point to transmit data to vehicle 11 which includes a relatively strong communication connection with the remote communication device 30.

In the data transfer 101A, data was transferred from the remote communication device 30 to the vehicle 14. In the data transfer 101B, data was transferred from the remote communication device 30 to the vehicle 16. The vehicles 14 and 16 now include the data and may retransmit the data to other vehicles. A determination may be made regarding V2V signal strength between vehicle 14 and other vehicles and between vehicle 16 and other vehicles. Data transfers may be designated from the vehicles 14 and 16 to other vehicles based upon the V2V signal strengths. In the data transfer 102C, the vehicle 14 retransmits the data from the vehicle 14 to the vehicle 17. In the data transfer 102D, the vehicle 16 retransmits the data from the vehicle 16 to the vehicle 19.

A third plurality of data transfers 103A, 103B, 103C, 103D, and 103E is illustrated representing simultaneous data transfers within the system 5. The data transfer 103A illustrates data transfer from the remote communication device 30 to the vehicle 13. The data transfer 103B illustrates data transfer from the remote communication device 30 to the vehicle 15. The data transfer 103C illustrates the data being retransmitted from the vehicle 14 to the vehicle 20. The data transfer 103D illustrates the data being retransmitted from the vehicle 12 to the vehicle 18. The data transfer 103E illustrates the data being retransmitted from the vehicle 16 to the vehicle 22.

A data transfer 104 is illustrated subsequent to the third plurality of data transfers, including one exemplary data transfer, retransmitting data from the vehicle 12 to the vehicle 21. In an alternative example, a data transfer 104' is illustrated. Determination of vehicles capable of retransmitting data may be dynamic. In one example, the vehicle 21 may be too far from the vehicle 12, with a resulting poor signal strength between the vehicle 12 and the vehicle 21 being too weak to accomplish the data transfer in a reasonable period. In another example, a computational load upon the vehicle 12 may increase between a beginning of the illustrated process and when the data transfer 104 is to begin, resulting in the vehicle 12 no longer being capable of efficiently retransmitting the data to the vehicle 21. The data transfer 104' may be dynamically selected, utilizing the vehicle 18, which was originally identified in the first portion of vehicles as an alpha vehicle, to retransmit the data from the vehicle 18 to the vehicle 21.

The plurality of vehicle 10 of FIGS. 1 and 2 may be parked vehicles stationary in a parking lot parked in an orderly grid. The plurality of vehicles 10 may alternatively be dispersed in a wide pattern with random distribution. The plurality of vehicles 10 may be mobile or in motion, with some or an entirety of the plurality of vehicles moving down a roadway and, for example, operating an autonomous platoon of vehicles. The proximity of each of the plurality of vehicles 10 to the remote communication device 30 may be dynamic, and determinations of which of the plurality of vehicles 10 presently belong to the second portion 40 each including a relatively strong communication connection with the remote communication device 30 may be iteratively performed.

The data transfers of FIG. 2 are exemplary. A number of alternative sequences of data transfers are envisioned, and the disclosure is not intended to be limited to the examples provided herein.

Figure 3:
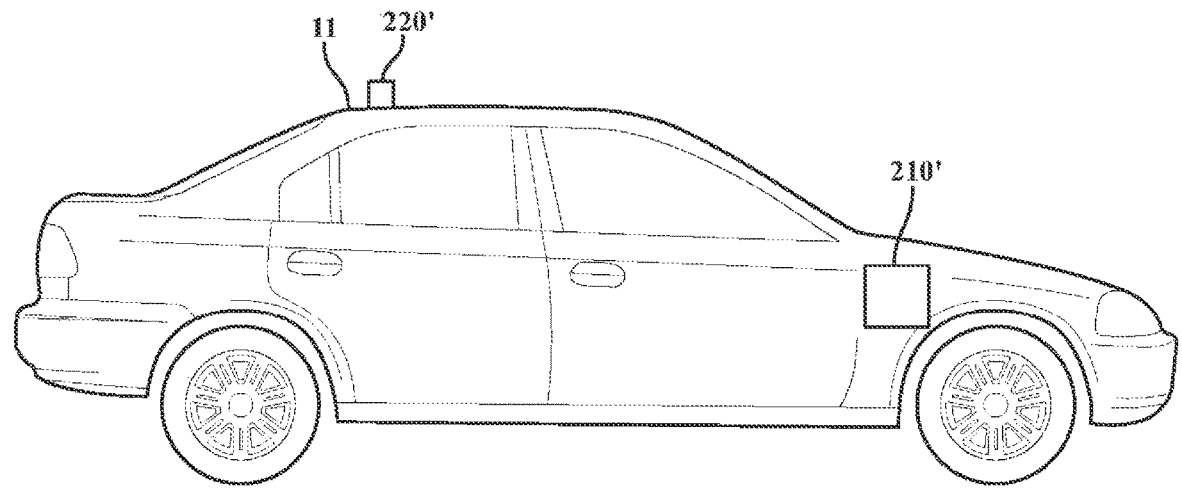
FIG. 3 schematically illustrates an identified alpha vehicle and a non-alpha vehicle of FIG. 1, in accordance with the present disclosure.
Figure 3:
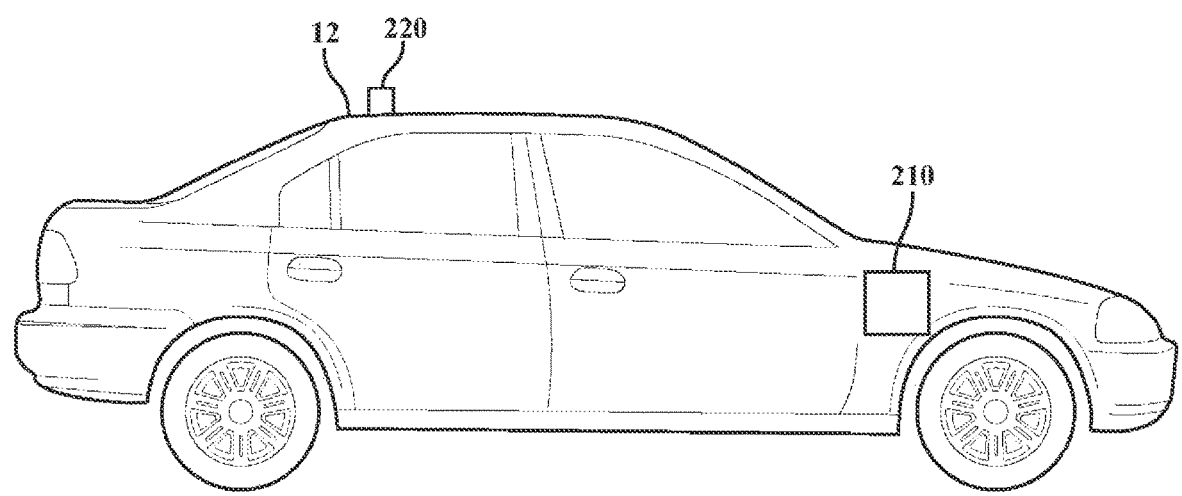

FIG. 3 schematically illustrates the vehicle 11 of FIG. 1 and the vehicle 12 of FIG. 1. The vehicle 12 is illustrated including a computerized telematics controller 210 and a wireless communications device 220. The vehicle 11 is illustrated including a computerized telematics controller 210' and a wireless communications device 220'. One of the computerized telematics controller 210 and the wireless communications device 220 are improved in hardware and/or performance to the respective one of the computerized telematics controller 210' and the wireless communications device 220', such that the vehicle 12 is identified to be an alpha vehicle. The vehicle 11 is not identified as an alpha vehicle. The computerized telematics controller 210 and the wireless communications device 220 may be newer devices as compared to their respective counterparts. The computerized telematics controller 210 and the wireless communications device 220 may be more expensive, upgraded devices as compared to their respective counterparts. The computerized telematics controller 210 and the wireless communications device 220 may be operating improved software, such as a more recently upgraded operating system, as compared to their respective counterparts.

Figure 4:
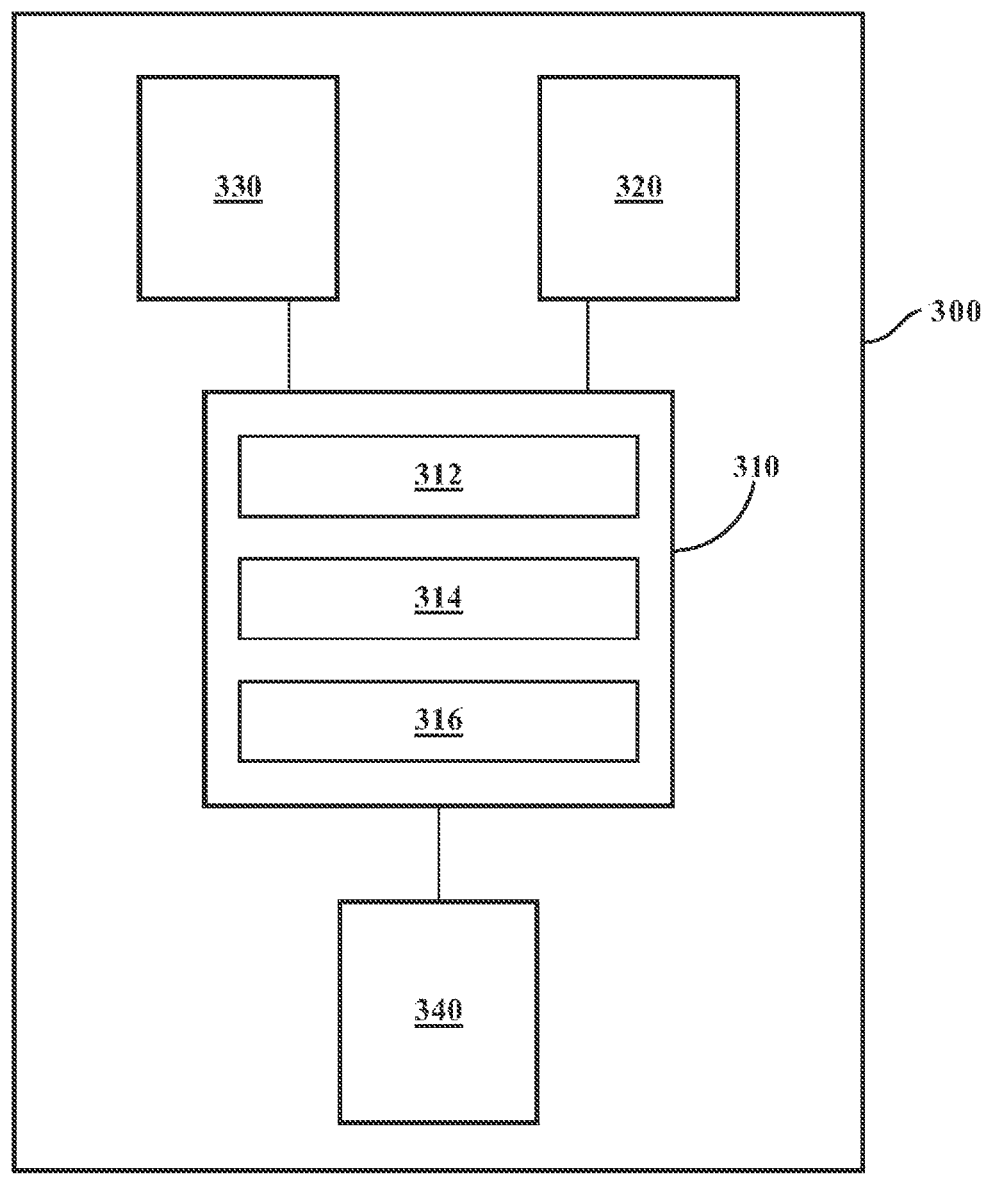
FIG. 4 schematically illustrates the computerized data transfer controller, in accordance with the present disclosure.

FIG. 4 schematically illustrates the computerized data transfer controller 300. The computerized data transfer controller 300 includes a computerized processing device 310, a communications device 320, an input output coordination device 330, and a memory storage device 340. It is noted that the computerized data transfer controller 300 may include other components and some of the components are not present in some embodiments. The computerized data transfer controller 300 may be operated as part of the remote server device 60 of FIG. 2, the remote communication device 30 of FIGS. 1 and 2, or remotely as a separate computerized device. In one alternative embodiment, some of the functionality of the illustrated data transfer controller 300 may instead be distributed to the telematics controllers 210 of the alpha vehicles of FIG. 1, which each include a computerized processing device similar in form and functionality to the processing device 310.

The processing device 310 may include memory, e.g., read only memory (ROM) and random-access memory (RAM), storing processor-executable instructions and one or more processors that execute the processor-executable instructions. In embodiments where the processing device 310 includes two or more processors, the processors may operate in a parallel or distributed manner. The processing device 310 may execute the operating system of the data transfer controller 300. Processing device 310 may include one or more modules executing programmed code or computerized processes or methods including executable steps. Illustrated modules may include a single physical device or functionality spanning multiple physical devices. The processing device 310 may further include programming modules, including a data transfer module 312, an alpha vehicle and signal strength determination module 314, and a highly functioning vehicles and dynamic adjustment module 316. In one embodiment, the data transfer controller 300 or portions thereof may include electronic versions of the processing device.

The communications device 320 may include a communications/data connection with a bus device configured to transfer data to different components of the system and may include one or more wireless transceivers for performing wireless communication.

The input output coordination device 330 includes hardware and/or software configured to enable the processing device 310 to receive and/or exchange data with on-board sensors of the host vehicle and to provide control of switches, modules, and processes throughout the vehicle based upon determinations made within processing device 310.

The memory storage device 340 is a device that stores data generated or received by the data transfer controller 300. The memory storage device 340 may include, but is not limited to, a hard disc drive, an optical disc drive, and/or a flash memory drive.

The data transfer module 312 includes programming to manage the data and/or OTA updates to be provided to the plurality of vehicles 10 of FIG. 1.

The alpha vehicle and signal strength determination module 314 includes programming to evaluate the hardware and functionality of the plurality of vehicles to identify the first portion or the alpha vehicles of the plurality of vehicles 10. The alpha vehicle and signal strength determination module 314 further includes programming to determine signal strengths and determine the second portion 40 of FIG. 1 including vehicles with relatively strong communication connections with the remote communication device 30 of FIG. 1.

The highly functioning vehicles and dynamic adjustment module 316 includes programming to select vehicles that are identified by the alpha vehicle and signal strength determination module 314 as highly functioning vehicles. This determination may be static, with a data transfer plan being finalized based upon vehicle and signal strength data available at some initial time, or this determination may be dynamic, with iterative synchronous data transfers being planned based upon which alpha vehicles have previously received the data and which vehicles are in relatively strong communication with the access point or the alpha vehicles with the data.

The computerized data transfer controller 300 is provided as an exemplary computerized device capable of executing programmed code to operate the disclosed process. A number of different embodiments of the data transfer controller 300 and modules operable therein are envisioned, and the disclosure is not intended to be limited to examples provided herein.

Figure 5:
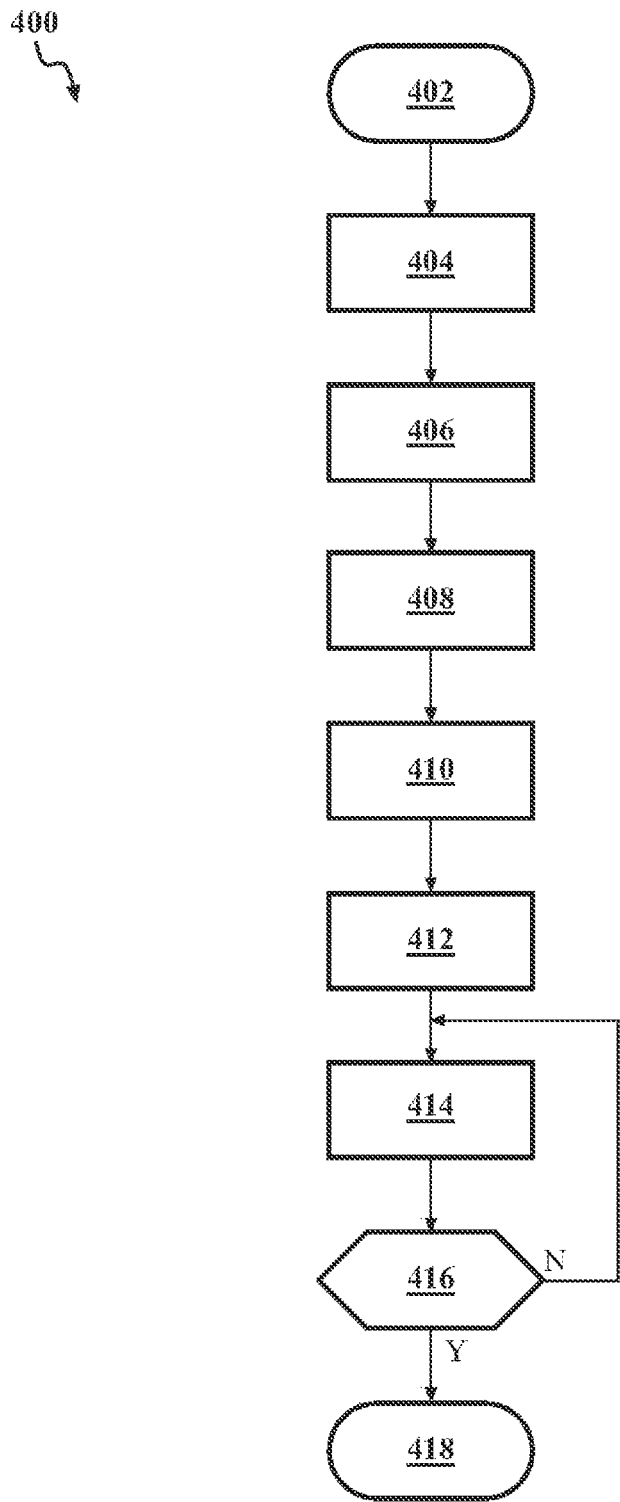
FIG. 5 is a flowchart illustrating a method for multi-mode connectivity for group vehicle activity and for over-the-air updates via time synchronized device-to-device side-link communications, in accordance with the present disclosure.

FIG. 5 is a flowchart illustrating a method 400 for multi-mode connectivity for group vehicle activity and for over-the-air updates via time synchronized device-to-device side-link communications. The method 400 starts with step 402. At step 404, a plurality of vehicles to receive a data transfer is identified. The data transfer may include an OTA update. At step 406, a first portion of a plurality of vehicles is identified as alpha vehicles including hardware identified enabling excellent wireless capabilities. At step 408, wireless communication signal strength is determined between each of the vehicles and an access point, and a second portion of the plurality of vehicles is identified including vehicles with relatively strong communication strength. At step 410, a third portion of the plurality of vehicles is identified including vehicles that belong to both the first portion and the second portion as highly functioning vehicles. At step 412, a series of sequential data transfers are identified and configured for distributing the data between the plurality of vehicles. The distributing includes the data first being transferred from the access point to at least one of the highly functioning vehicles and then being transferred from the highly functioning vehicle(s) to at least one of the other vehicles of the plurality of vehicles. At step 414, an iteration of the series of sequential data transfers is performed. At step 416, a determination is made whether the series of sequential data transfers has been completely performed. If the series has not yet been completely performed, the method 400 returns to step 414 where a further iteration is performed. If the series has been completely performed, the method 400 advances to step 418 where the method 400 ends. The method 400 is exemplary. A number of additional and/or alternative steps are envisioned. For example, a step including dynamic adjustment of the series of sequential data transfers may be included as part of the illustrated steps or as a new step.

While the best modes for carrying out the disclosure have been described in detail, those familiar with the art to which this disclosure relates will recognize various alternative designs and embodiments for practicing the disclosure within the scope of the appended claims.

What is claimed is:

1. A system for multi-mode connectivity for group vehicle activity and for over-the-air updates via time synchronized device-to-device side-link communications, the system comprising:
   a remote communication device including a wireless transmitter configured for providing data through a wireless connection;
   a plurality of vehicles to receive the data through the wireless connection; and
   a computerized data transfer controller, including programming to:
      analyze hardware of each of the plurality of vehicles to determine a first portion of the plurality of vehicles as alpha vehicles including hardware enabling excellent wireless capabilities;
      monitor signal strength between each of the plurality of vehicles and the remote communication device to determine a second portion of the plurality of vehicles as vehicles including relatively strong communication strength;
      determine a third portion of the plurality of vehicles including highly functioning vehicles that belong to the first portion and to the second portion;
      generate a series of data transfers useful to first transfer the data from the remote communication device to one of the plurality of highly functioning vehicles and subsequently transfer the data from the one of the plurality of highly functioning vehicles to a second of the plurality of vehicles; and
      transfer the data from the remote communication device to the one of the plurality of highly functioning vehicles; and
   wherein the one of the plurality of highly functioning vehicles subsequently retransmits the data to the second of the plurality of vehicles.

2. The system of claim 1, wherein the remote communication device includes one of an access point, a cellular tower, or a wi-fi network.

3. The system of claim 1, wherein the programming to generate the series of data transfers includes programming to generate a plurality of simultaneous data transfers.

4. The system of claim 1, wherein the series of data transfers include an over-the-air update to one of software or firmware.

5. The system of claim 1, wherein the programming to monitor the signal strength between each of the plurality of vehicles and the remote communication device is dynamically iteratively performed; and
   wherein the programming to generate the series of data transfers is adjusted based upon the iteratively performed monitoring of the signal strength.

6. The system of claim 1, wherein the remote communication device is a first remote communication device; and
   further comprising a second remote communication device.

7. The system of claim 6, wherein the first remote communication device and the second remote communication device each utilize a different communication technology.

8. The system of claim 1, wherein one of the plurality of vehicles includes a plurality of electronic control units to be updated;
   wherein the programming to generate the series of data transfers includes a first data transfer from a first one of the remote communication device or one of the high functioning vehicles to a first of the plurality of electronic control units; and
   wherein the programming to generate the series of data transfers further includes a second data transfer from a different one of the remote communication device or one of the high functioning vehicles to a second of the plurality of electronic control units.

9. The system of claim 8, wherein the first data transfer and the second data transfer are simultaneous.

10. The system of claim 1, wherein the remote communication device transfers the data to the plurality of the highly functioning vehicles; and
    wherein the plurality of the highly functioning vehicles subsequently transfers the data to a remainder of the plurality of vehicles.

11. A system for multi-mode connectivity for group vehicle activity and for over-the-air updates via time synchronized device-to-device side-link communications, the system comprising:
    a first remote communication device including a first wireless transmitter configured for providing data through a first wireless connection;
    a second remote communication device including a second wireless transmitter configured for providing the data through a second wireless connection;
    a plurality of vehicles to receive the data through one of the first wireless connection or the second wireless connection; and
    a computerized data transfer controller, including programming to:
       analyze hardware of each of the plurality of vehicles to determine a first portion of the plurality of vehicles as alpha vehicles including hardware enabling excellent wireless capabilities;
       monitor signal strength between each of the plurality of vehicles and the first remote communication device and the second remote communication device to determine a second portion of the plurality of vehicles as vehicles including relatively strong communication strength;
       determine a third portion of the plurality of vehicles including a plurality of highly functioning vehicles that belong to the first portion and to the second portion;
       generate a series of data transfers useful to first transfer the data from one of the first remote communication device or the second remote communication device to one of the plurality of highly functioning vehicles and subsequently transfer the data from the one of the plurality of highly functioning vehicles to a second of the plurality of vehicles, wherein the computerized data transfer controller selects between the first remote communication device and the second remote communication device based upon one of cost or time; and transfer the data from the one of the first remote communication device or the second remote communication device to the one of the plurality of highly functioning vehicles; and wherein the one of the plurality of highly functioning vehicles subsequently retransmits the data to the second of the plurality of vehicles.

12. The system of claim 11, wherein the programming to generate the series of data transfers includes programming to generate a plurality of simultaneous data transfers.

13. The system of claim 11, wherein the series of data transfers include an over-the-air update to one of software or firmware.

14. The system of claim 11, wherein the programming to monitor the signal strength is dynamically iteratively performed; and wherein the programming to generate the series of data transfers is adjusted based upon the iteratively performed monitoring of the signal strength.

15. The system of claim 11, wherein the first remote communication device and the second remote communication device each utilize a different communication technology.

16. A method for multi-mode connectivity for group vehicle activity and for over-the-air updates via time synchronized device-to-device side-link communications, the method comprising:

operating a remote communication device including a wireless transmitter configured for providing data through a wireless connection to a plurality of vehicles through the wireless connection; and within a computerized processor:

analyzing hardware of each of the plurality of vehicles to determine a first portion of the plurality of vehicles as alpha vehicles including hardware enabling excellent wireless capabilities;

monitoring signal strength between each of the plurality of vehicles and the remote communication device to determine a second portion of the plurality of vehicles as vehicles including relatively strong communication strength;

determining a third portion of the plurality of vehicles including a plurality of highly functioning vehicles that belong to the first portion and to the second portion;

generating a series of data transfers useful to first transfer the data from the remote communication device to one of the plurality of highly functioning vehicles and subsequently transfer the data from the one of the plurality of highly functioning vehicles to a second of the plurality of vehicles; and transferring the data from the remote communication device to the one of the plurality of highly functioning vehicles; and subsequently retransmitting the data from the one of the plurality of highly functioning vehicles to the second of the plurality of vehicles.

17. The method of claim 16, wherein generating the series of data transfers includes generating a plurality of simultaneous data transfers.

18. The method of claim 16, wherein monitoring the signal strength between each of the plurality of vehicles and the remote communication device is dynamically iteratively performed; and wherein generating the series of data transfers is adjusted based upon the iteratively performed monitoring of the signal strength.

19. The method of claim 16, further comprising:

transferring the data from the remote communication device to the plurality of the highly functioning vehicles; and subsequently transferring the data from the plurality of the highly functioning vehicles to a remainder of the plurality of vehicles.

* * * * *